No. 607,461. Patented July 19, 1898.
F. H. RICHARDS.
AUTOMATIC WEIGHING MACHINE.
(Application filed Aug. 13, 1897.)
(No Model.) 6 Sheets—Sheet 1.

Fig. 1.

Witnesses:
Inventor:

No. 607,461. Patented July 19, 1898.
F. H. RICHARDS.
AUTOMATIC WEIGHING MACHINE.
(Application filed Aug. 13, 1897.)
(No Model.) 6 Sheets—Sheet 2.

Fig. 2.

Witnesses:
O. W. Smith
J. L. Edwards Jr.

Inventor:
F. H. Richards

No. 607,461. Patented July 19, 1898.
F. H. RICHARDS.
AUTOMATIC WEIGHING MACHINE.
(Application filed Aug. 13, 1897.)
(No Model.) 6 Sheets—Sheet 4.

Fig.6.

Witnesses;
Inventor:

No. 607,461. Patented July 19, 1898.
F. H. RICHARDS.
AUTOMATIC WEIGHING MACHINE.
(Application filed Aug. 13, 1897.)
(No Model.) 6 Sheets—Sheet 5.

Fig. 7.

Witnesses: Inventor:

No. 607,461. Patented July 19, 1898.
F. H. RICHARDS.
AUTOMATIC WEIGHING MACHINE.
(Application filed Aug. 13, 1897.)

(No Model.) 6 Sheets—Sheet 6.

Fig. 8.

Witnesses:
Inventor:

UNITED STATES PATENT OFFICE.

FRANCIS H. RICHARDS, OF HARTFORD, CONNECTICUT.

AUTOMATIC WEIGHING-MACHINE.

SPECIFICATION forming part of Letters Patent No. 607,461, dated July 19, 1898.

Application filed August 13, 1897. Serial No. 648,103. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Automatic Weighing-Machines, of which the following is a specification.

This invention relates to automatic weighing-machines of that class adapted for weighing predetermined quantities of granular or other material, and more especially to a machine of that class in which an overload is first supplied to the load-receiver and subsequently reduced to a true load by the removal of the surplus or excess material therefrom.

In automatic weighing-machines as heretofore constructed it has been customary to supply material to a suitable load-receiver by valve mechanism comprising one or more valves adapted to control the flow of the stream from the discharge end of a suitable supply-spout or hopper or other source of supply, and in all machines of this type it is essential to the proper operation of the several coacting mechanisms of the weighing-machine that the supply-spout be entirely closed by the action of a suitable cut-off valve; but, owing to the fact that the material which such machines are designed to weigh is frequently of a lumpy character and often contains foreign bodies of large size or other large masses which are liable to choke the discharge end of such supply-spout and prevent the closing of such cut-off valve, I have provided in the present case valve mechanism by means of which when the usual cut-off valve fails to work by reason of the clogging of the same by a lump or large mass of material or by a stick or other body a supplemental safety-valve, dependent for its operation upon the failure of said main valve to close, will be actuated and cut off the supply-stream from the supply-spout at a point preferably some distance from the main cut-off valve, so as to avoid interference of such foreign body with the operation of said safety cut-off valve.

Another important object of my present invention is to provide, in connection with a movable load-receiver, a load-discharger supported independently of such receiver, these two members having in this case independent points of support, one of which is movable relatively to the other. In the preferred construction I employ a load-receiver adapted to move vertically in the usual manner and having a discharge-opening in the lower end thereof, this receiver being pivotally supported on the upper one of a pair of independently-mounted separately-movable beam mechanisms, from the lower of which is suspended a load-discharger controlling the opening in the lower end of the receiver. In the normal positions of the parts when the discharge-opening in the load-receiver is closed the two beam mechanisms will move in unison, as will also the load-receiver and the load-discharger; but the parts are so organized that on the release of the load-discharger to permit the efflux of the completed load from the receiver said receiver and discharger will be capable of movement relatively to each other, and the beam mechanisms will also have at this time independent movements with respect to each other. By means of this construction the load-receiver and its counterbalancing beam mechanism are permitted to return to their normal positions as soon as the latch is tripped which controls the release of the load-discharger, and hence all of the weighing mechanism will return quickly to the uppermost position of the parts, while only the load-discharger and its small counterpoising device will be retarded in their return to their normal positions by the discharge of the material of the completed load.

In connection with the mechanisms hereinbefore referred to I also employ improved interlocking devices for controlling the operation of the two valves of the stream-controlling means, and I also make use of improved devices for reducing the overload and for subsequently restoring to the main load that portion of the charge remaining in the load-reducing means.

In the drawings accompanying and forming part of this specification.

Similar characters designate like parts in all the figures of the drawings.

Any suitable framework may be employed for supporting the several operative parts of my improved weighing-machine. That shown herein comprises a pair of side frames 2 and 2', a hollow chambered supporting-base 3, from which the side frames rise, and a top plate or cross-beam 5, carrying a hopper II for supplying material to the load-receiver of the weighing mechanism. In the present instance this hopper embodies a main supply-spout 10, having the usual discharge-opening at the lower end thereof, and a second spout, (designated by 10',) in this case disposed above the spout 10 and normally operating in conjunction therewith to deliver material to the load-receiver.

In the normal operation of the machine the supply of material to the receiver will be governed by some suitable stream-controlling means—such, for example, as the valve 70, which is journaled at its opposite ends in bearings in the ends of the lower portion or spout 10 of the hopper II and constitutes a normally-effective main cut-off valve, which when the machine is operating properly will control by itself the flow of the stream from the hopper. When, however, this valve fails to close by reason of the presence of some obstruction of large size, such as hereinbefore referred to, or when for any other reason it fails to close, a second cut-off valve, constituting a normally-ineffective supplemental or safety valve, should be brought into action to perform this function of the main valve and shut off the flow of material to the load-receiver. This supplemental or safety cut-off valve is designated in a general way by 75 and is supported for oscillation at its opposite ends in bearings, one of which in this case is carried by the hopper and the other by the top beam 5, although it will be obvious, of course, that the location of said bearings is immaterial. This valve is mounted in substantially the same way and operates in substantially the same manner as the main valve 70; but the two valves operate in opposite directions for cutting off the flow of material from their respective supply-spouts, as will be evident by reference to the drawings.

In order that the safety cut-off valve may operate to shut off the flow of material when the main valve fails to close and for the purpose also of enabling the safety cut-off valve to return to its normal position when an obstruction of sufficient size to prevent the proper closing of the main valve is removed and the latter thereupon closes, I have illustrated herein connections between the two valves and valve-actuating means coöperating therewith, all of which are so organized that the closing of the safety-valve is controlled by and is dependent upon the non-closing of the main valve, due to clogging or some similar interference with its operation. The connection illustrated herein is a linkage comprising three elements or links, (designated, respectively, by 25, 25', and 25",) the links 25 and 25" being pivotally connected to the respective valves 70 and 75, while the link 25' joins the other two.

In order that the safety-valve may be held open at all times except when the main valve is operated improperly, I provide therefor an independent valve-opening actuator, preferably in the form of a counterweight 75', secured to the shaft 30' of the safety-valve, the link 25" being connected, preferably, to a rock-arm 75", forming an extension of the arm of the counterweight.

The valve-opening actuator, by means of which the main valve 70 is opened, is independent in action of the counterweight 75' and is preferably formed by the usual counterweighted lever carried by the beam mechanism and operating substantially in the manner described and illustrated in prior patents granted to me, and this actuator will be referred to more particularly hereinafter.

The valve-closing means which I prefer to employ will be also a counterweighted lever, which may be supported in the proper position upon any suitable part of the weighing-machine, it being in this case pivoted on one side of the hopper II. This valve-closing actuator, which is designated in a general way by 90, constitutes a valve-closing device common to both of the valves and operates upon them through the linkage previously described. In the construction illustrated in the drawings the link 25' is pivotally connected at its center to the arm of this counterweighted lever 90. This counterweight is of very much greater efficiency than that illustrated at 75' for opening the valve 75; but as the valve 70 has no actuating or balancing weight applied thereto and as it opposes less resistance to the operation of the counterweighted lever 90 than the valve 75, owing to the fact that the counterweight 75' is of such mass as to hold the safety-valve normally at the extreme limit of its opening movement under all normal working conditions, and except when the main valve meets with an unexpected obstruction and hence opposes an increased or abnormal resistance to the action of the valve-closing counterweight 90, the said last-mentioned counterweight or valve-closing actuator will be effective normally for closing the main valve on the descent of the load-receiver, and this closing movement will be transmitted through the linkage and will be due to the fact that the point of connection of the link 25″ with the rock-arm 75″ will then be a fixed point. When, however, during the closing of the main valve 70 an abnormal resistance is opposed to this movement—such, for example, as will be offered by a large mass of material or foreign body between the valve and one of the walls of the supply-spout, as shown, for example, in Fig. 5—the point of connection of the link 25 with the main valve would then become a fixed point and the resistance of said valve would be sufficient to overbalance that of the safety cut-off valve, and hence on the descent of the valve-closing actuator, the force of the same will be transmitted through the linkage to the rock-arm 75″ and to the safety-valve and would cause the closing of the latter. This action will take at any point in the closing movement of the main valve whether the latter is almost wide open or whether it is very nearly shut.

The valve-closing actuator is normally limited in its downward movement by some suitable stop, which will be projected into its path only when the main valve is operating properly, and hence it will be clear that a stop, such as 26, movable in unison with the main valve may be employed for limiting the downward movement of this actuator. This stop 26 is intended to coact with a stop on the arm of the valve-closing actuator—such, for example, as the pin 27, on which the link 25 is pivoted. It will be noticed by referring to Fig. 6, for example, that when the main valve is entirely closed the stop-arm carrying the stop 26 stands in a vertical position, and hence the thrust of the actuator will be transmitted to the shaft 30 of the main valve and the downward movement of the actuator will be stopped. If, however, the main valve is not entirely closed, it will be equally clear that the stop 26 will not engage the pin 27 on this actuator, and hence that said actuator may have a greater range of downward movement than during its normal operation and that it will descend and carry with it the links 25′ and 25″ and operate the safety-valve to shut the same, as will be clear by referring to Figs. 4 and 5, in which the former illustrates the normal movement of the actuator for closing the main valve and its abnormal range of movement for shutting the safety-valve.

It will be obvious from the preceding description of the manner in which the main valve and the safety-valve are connected and also of the manner in which they are operated by their common valve-closing actuator that the linkage joining these valves has two alternately-effective fixed points at opposite ends thereof and that the valves themselves are selectively operable in opposite directions, one being held out of action while the other is operated.

Figure 1:
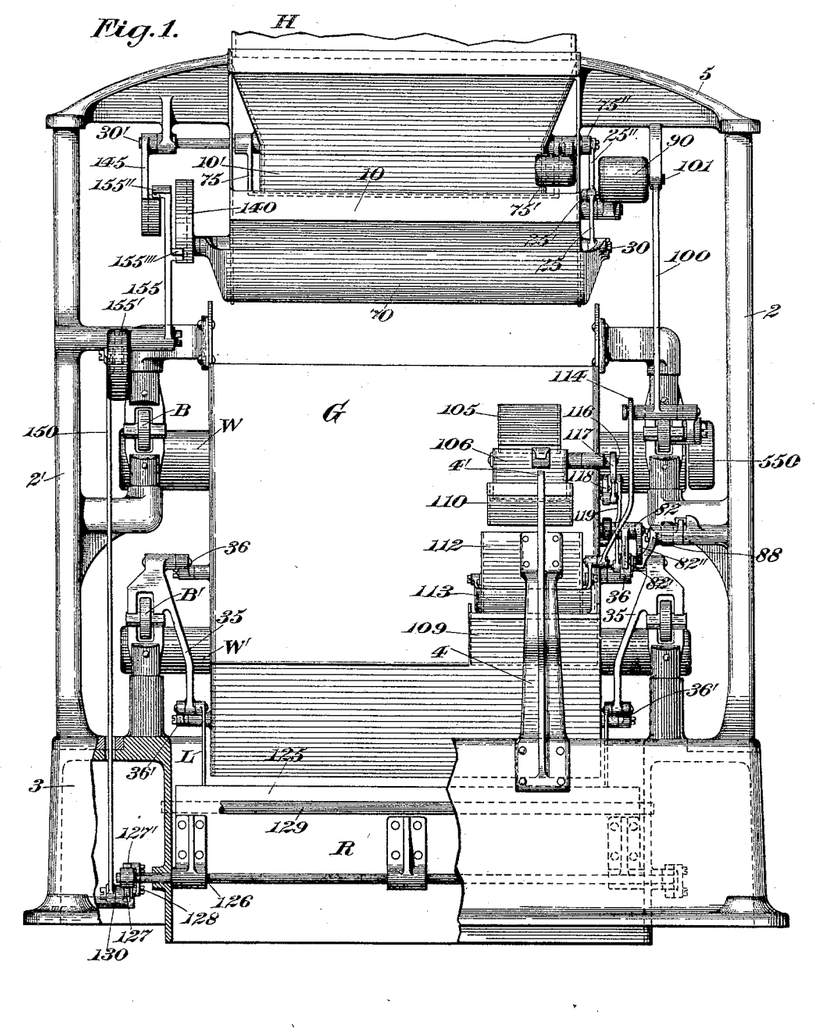
Figure 1 is a sectional front elevation of a weighing-machine embodying my present improvements.

The stream of material which is delivered from the supply-spout enters the usual load-receiver, which is designated in a general way by G and is in many respects similar to the load-receivers of other overloading-machines described in patents heretofore granted to me. This load-receiver is pivotally supported in the usual manner by a knife-edge bearing on a beam mechanism (designated in a general way by B) mounted on the framework. The load-receiver has the usual load-discharging opening therein, preferably at the lower end thereof, and this is intended to be closed by a load-discharger while the load is being made up. Ordinarily this load-discharger is pivotally supported on the load-receiver; but in this case the load-discharger, which is designated in a general way by L, is supported independently of the load-receiver, preferably on a secondary beam mechanism, (designated by B′.) While this load-discharger may be of any suitable construction, I prefer to employ one of such shape as to shed or deflect the mass of material in the bucket when the load-discharger is released, this stream-deflecting discharger being preferably of inverted-V shape and controlling a correspondingly-shaped opening in the lower end of the bucket. In this case also the load-discharger is pivotally supported by the beam mechanism, it being suspended therefrom by depending arms or rods 35, (see Fig. 1,) which in turn are carried on the beam mechanism B′ by the usual knife-edge bearings. In order to maintain the receiver and the discharger in the same relative positions laterally with respect to each other during the movements thereof, I employ some suitable guiding means for positively positioning the load-discharger during its movements, two pairs of guide-links 36 and 36′ being shown for this purpose, these links connecting the upper and the lower ends of the arms 35 with the load-receiver.

Both the load-receiver and the load-discharger are vertically reciprocatory and are superposed with respect to each other, and when the discharger is latched in its closed position the two move in unison as one member. For this reason the pivots of the load-receiver and the load-discharger are equidistant from the pivots of their respective beam mechanisms, and hence both the primary beam mechanism B and the secondary beam mechanism B′ will move normally in unison also until the load-discharger is released, when the discharger will have an independent movement relatively to the receiver and the secondary beam mechanism will also have a movement separate from and independent of that of the primary beam mechanism. The relative movement of the load-discharger with respect to the receiver will of course be due to the fact that these two members are separately counterpoised by the counterweights of their respective beam mechanisms. As the counterweight W for the receiver is of greater mass and efficiency than that shown at W' for the discharger, the receiver will of course be returned quickly to its normal position as soon as the load-discharger is released on the completion of a full load in the receiver, and the counterweight W' should be so proportioned as to cause the return of the discharger as soon as all the material of a discharged load flows out of the receiver and not until then.

As the two beam mechanisms are superposed and located at a considerable distance from each other and as the receiver and the discharger are normally movable with the two beam mechanisms as one member, it will be clear that the beam mechanisms positively control the position of the bucket sidewise during the ascending and descending movements thereof and prevent absolutely lateral swinging of the upper and lower ends thereof with respect to each other.

The valve-opening actuator for the main valve (to which actuator reference has been made hereinbefore) is pivotally mounted on the poising side of the beam mechanism B and is designated herein by 550. To the inner end of this actuator, which is in the form of a counterweighted lever, is pivoted a connecting-rod 100, having at its upper end a sliding connection with a pin 101 on the valve-closing actuator and adapted to operate said valve-closing actuator to return the latter to its normal uppermost position. (Shown in Fig. 2.)

As hereinbefore stated, the machine illustrated in the present case is an overloading one, and the load-receiver is intended to rise to a poise after the excess of material delivered thereto by the supply-spout has been removed. Hence I have shown at one side of the bucket, near the upper end thereof, a load-reducing opening formed by a passage through a small spout 105, at the lower end of which is pivoted a swinging spout 106, normally in a vertical position, so that its lower end will be closed by a cut-off plate 107, all of these parts being in this case carried by the load-receiver. Two auxiliary material-receiving openings are illustrated beneath the load-reducing opening, both of these supply-openings being preferably formed by passages through spouts—such, for example, as those shown at 108 and 109, respectively. The load-receiver also carries another spout 110, adjacent to the swinging spout 106 and in position to receive the surplus material therefrom and deliver it to an auxiliary receiver 112, mounted on a bracket 4, rising from the base 3 of the machine. The lower end of this spout is controlled in the usual manner by means of a swinging valve 113, operated by a connecting-rod 114, having a sliding connection with the valve-opening actuator 550 on the beam mechanism B.

Figure 6:
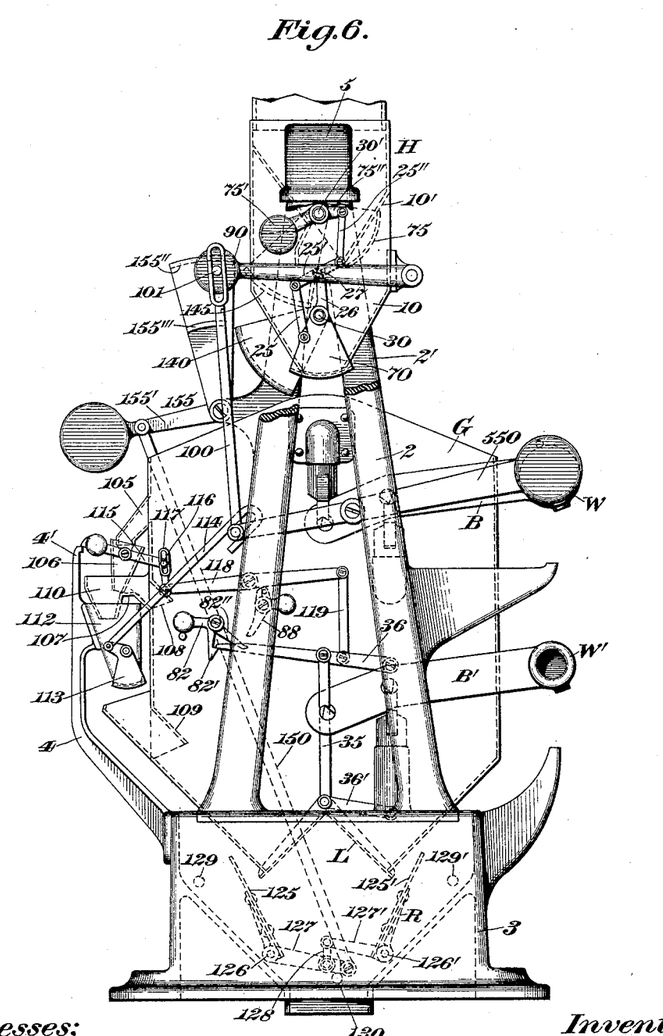
Fig. 6 is a side elevation similar to Fig. 2, showing the positions of the parts during the reducing of the overload.
Figure 7:
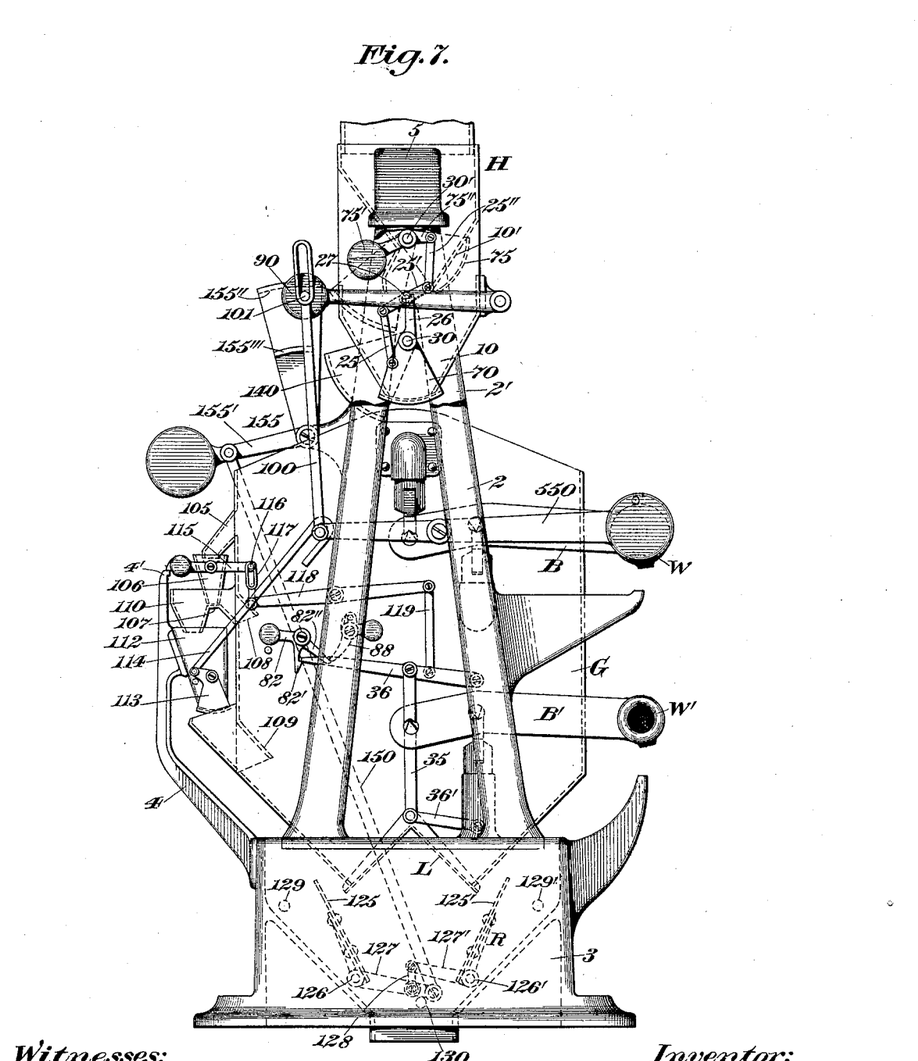
Fig. 7 is a similar view showing the positions of these parts on the completion of the reducing action and just prior to the release of the load-discharger.
Figure 8:
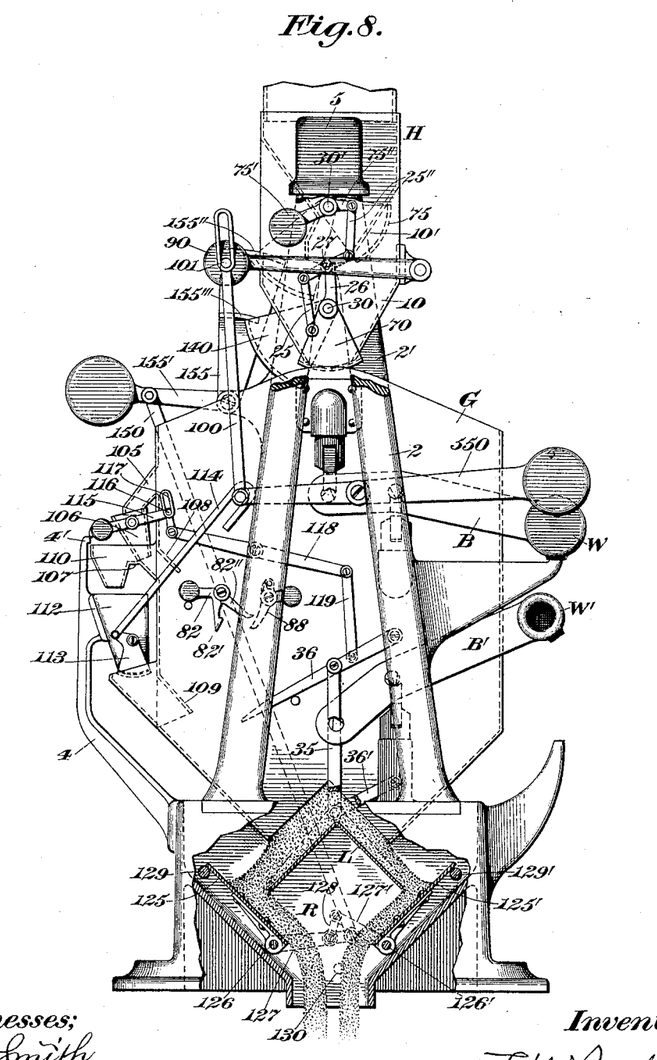
Fig. 8 is a sectional side elevation showing the positions of these parts after the release of such load-discharger and during the discharge of the load from the receiver.

The swinging spout 106 has secured thereto an arm 115, carrying near the outer end thereof a counterweight, the inner end of this arm having a pin 116, adapted to slide in the eye of an open link 117, connected to the lever 118, carried on the side of the bucket, and connected at its opposite ends by means of a link 119 with one of the guide-arms 36. This guide-arm has an extension in the nature of a lever-arm, the free end of said lever being so positioned as to be engaged by a counterweighted latch, such as 82, of the usual construction. This latch has a detent-arm 82', which engages the end of the arm 36, and a releasing-arm 82'', adapted to oscillate in the path of a by-pass latch-tripper, such as 88, carried on the framework. This guide-arm 36 also has a pivotal connection with one of the rods or arms 35, from which the load-discharger L is suspended, and hence the connections between this discharger and the swinging spout 106 form means for controlling the movements of the spout 106. The outer end of the arm 115 is adapted to engage the upper end 4' of the bracket 4, and this fixed stop forms a resistance-actuator for swinging the spout 106 on the descent of the bucket, as shown in Fig. 6, to deliver surplus material into the auxiliary receiver 112, while on the release of the load-discharger the counterweight on the swinging spout will be permitted to operate by the connections to the load-discharger and will swing said spout to the position shown in Fig. 8, when it will deliver the material which it carries into the main portion of the load-receiver to be discharged through the opening in the bottom of the latter as a part of the load. The stop 4' limits the stroke of said counterweight during this operation, as will be seen from Fig. 8. Except when the load-receiver descends to the position shown in Fig. 6 and except when the load-discharger is opened the connections from the latter will be effective to hold the swinging spout 106 in the position shown in Fig. 2, with its lower end closed by the cut-off plate 107.

In order to prevent the opening of either of the valves until all of the material discharged from the hopper shall have passed out through the base of the machine, I make use of a regulator (designated in a general way by R) preferably comprising oppositely-disposed inclined regulator-blades 125 and 125', supported for oscillation on shafts 126 and 126', journaled in bearings in said base and having rock-arms 127 and 127', connected at their inner ends by means of a link 128 for movement in unison, these oppositely-disposed blades 125 and 125' forming between them a trough having yielding sides, the movements of which are limited by suitable stops, such as 129 and 130

129', a stop, such as 130, being shown in this case for limiting the return movements of the regulator-blades.

In order to control the movements of the valves and the regulator, I employ in connection with these members a system of interlocking stops, the individual blocking members being substantially similar in construction to those shown in prior patents granted to me. In this case the valve 70 has a stop 140 movable therewith and the valve 75 has a corresponding stop 145, and the movements of these two stops are independent of each other. Some suitable blocking means should of course be employed for coöperating with the stops on the valves to limit the movements of the latter, and this blocking means will be operative with a movable discharge-controlling member of the weighing-machine. In this case this discharge-controlling member is the regulator, and in the construction illustrated the latter is connected by means of a connecting-rod 150 with a counterweighted angle-lever 155, pivoted on the framework. This angle-lever has an arm 155', to which the actuating-rod 150 is joined and which also carries a counterweight constituting an actuator for returning the regulator to its normal position. The other arm of the angle-lever carries in this case two blocking-stops 155'' and 155''', so shaped and located as to coöperate with the stops 140 and 145 on the two valves.

Figure 2:
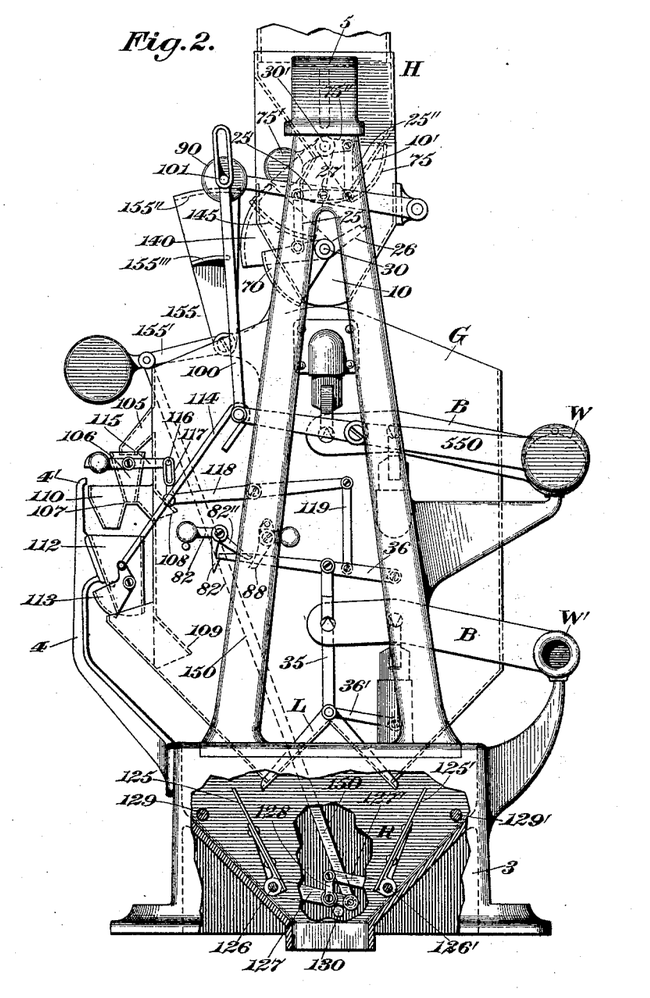
Fig. 2 is a sectional side elevation of the same, showing the parts in their normal positions ready to receive material for the making up of a load.
Figures 3, 4, 5:
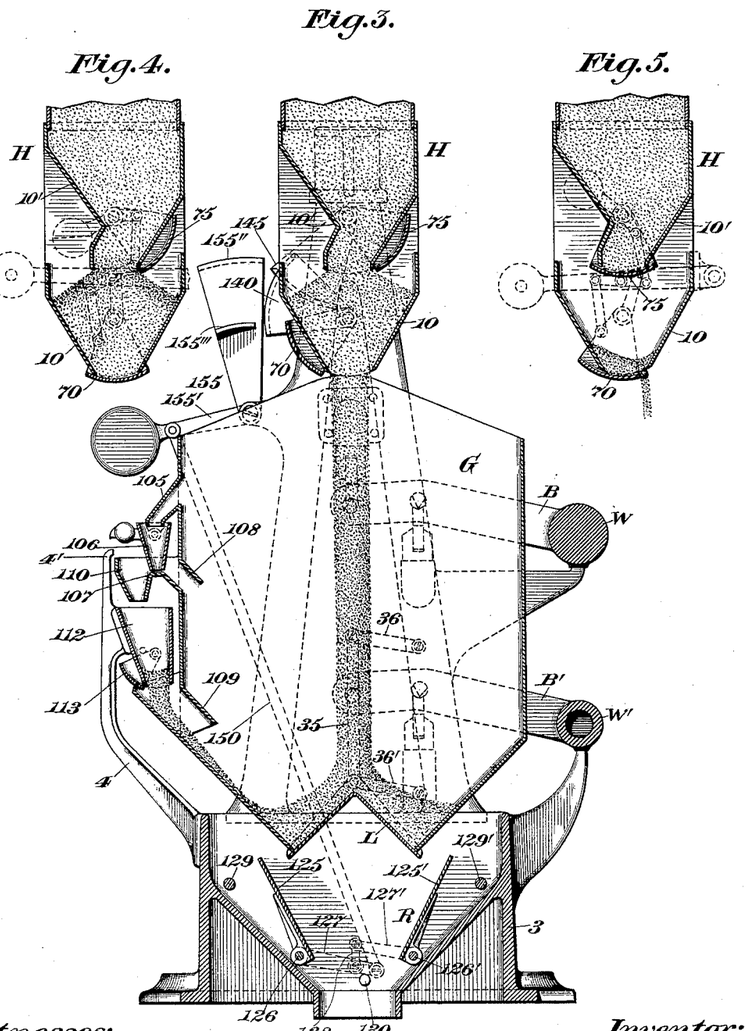
Fig. 3 is a vertical section of the same, illustrating the parts in the same positions as in Fig. 2.
Fig. 4 is a vertical sectional detail illustrating the valve mechanism and showing the main cut-off valve closed after delivering an overload to the load-receiver.
Fig. 5 is a view similar to Fig. 4, showing the supplemental or safety cut-off valve closed on the failure of the main valve to shut.

By referring to Fig. 2 it will be seen that when the machine is operating normally the stop 140 will be in position to block the movement of the regulator, while if the parts are in the positions shown in Fig. 6 the stops 155'' and 155''' will be clear of the stops 140 and 145, and the regulator may be operated by the discharge of the load on the release of the load-discharger and in opposition to the force of the counterweight on the arm 155. If, however, the main valve is clogged, as shown in Fig. 5, both of the stops 140 and 145 will be in their blocking positions.

The operation of a machine constructed in accordance with my present improvements is as follows: It being understood that all the parts are in the positions shown in Fig. 2, with both valves wide open, the load-discharger latched, the regulator in its normal position, and the discharge end of the swinging spout 106 closed by the cut-off plate 107, it will be seen that on the delivery of an overload to the receiver the latter will descend and the main valve, operating normally, will close and withdraw the blocking-stop 140 from the paths of movement of the stops 155'' and 155'''. At the same time the arm 82'' of the latch will pass by the by-pass tripper 88, and the outer end of the arm 115 on the swinging spout 106 will strike the fixed stop 4', and said spout will be swung to the left, as seen in Fig. 6, and the surplus or excess of material in the receiver will be delivered through the fixed spout 110 into the auxiliary receiver 112 on the bracket 4, the discharge end of this auxiliary receiver being closed at this time by the valve 113. As soon as the surplus is removed from the load the load-receiver rises and the counterweight on the swinging spout 106 becomes effective to restore said spout to its normal or central position, with its lower end closed by the cut-off plate 107. The ascending movement of the load-receiver is continued until the arm 82'' of the latch strikes the latch-tripper 88, whereupon the latch is released and the load-discharger is unlatched. As soon as this occurs the load-receiver and its beam mechanism, being relieved of the weight of most of the material therein, rise and permit the counterweight on the swinging spout to become effective to shift the latter toward the bucket to deliver the material in the fixed load-reducing spout and in the swinging spout into the main portion of the receiver, this material being part of the weighed load. The weight of the charge carries the load-discharger down as soon as the latter is released, thereby causing the latter and the secondary beam mechanism to move relatively to the load-receiver and the primary beam mechanism. The material flowing out of the load-receiver is shed by the discharger, and as soon as it reaches the regulator the two oppositely-disposed regulator-blades thereof are forced downward, and the angle-lever 155 is actuated to carry the stop-faces 155'' and 155''' into position to block the movements of the stops 145 and 140, and thereby prevent the opening movement of the main valve and the closing of the safety-valve. The load-discharger will be held in the position shown in Fig. 8 until substantially all of the material of the load shall have passed by the same, and although said discharger will begin to close before the last portion of the load shall have passed by it its construction is such that it will shed all the material and deliver it all to the regulator before it returns to its normal closed position. The load-discharger will of course be latched in position by the engagement of the free end of the arm 36 with the detent 82' of the latch 82 when the load-discharger rises, thus latching the receiver and the discharger, so that they and the two beam mechanisms will move in unison. The interlocking stops of course prevent the return of the valve-opening actuator 550 to its normal position until all of the material in the regulator flows through the same, whereupon the regulator will return to the position shown in Fig. 2 and withdraw the stops 155'' and 155''' from engagement with the valve-stops, thereby permitting the valve-opening actuator 550 to return to its normal position, raise the valve-closing actuator 90, and open the main valve. At the same time said actuator 550 draws open the valve 113 by means of the connecting-rod 114, and the material in the auxiliary receiver 112 is discharged into the bucket for making up a new load, it being obvious that this valve will be closed again when the load-receiver descends.

Having described my invention, I claim—

1. The combination, with a supply-spout, of a normally-effective main cut-off valve; a normally-ineffective dependently-operative safety cut-off valve controlled by the main valve on the failure of the latter to close properly; and valve-closing means operable for closing said valves selectively.

2. The combination, with a supply-spout, of a pair of mutually-dependent cut-off valves one constituting a normally-effective main cut-off valve and the other a normally-ineffective safety cut-off valve controlled by the main valve on the failure of the latter to close properly; and valve-closing means for closing said valves selectively.

3. The combination, with a supply-spout, of a normally-effective main cut-off valve; a normally-ineffective dependently-operative safety cut-off valve, normally open and controlled by the main valve on the failure of the latter to close properly; normally-effective valve-opening means for the safety cut-off valve; and valve-closing means.

4. The combination, with a supply-spout, of a normally-effective main cut-off valve; a normally-ineffective dependently-operative safety cut-off valve, normally open and controlled by the main valve on the failure of the latter to close properly; a normally-effective valve-opening counterweight carried by the safety cut-off valve; and valve-closing means.

5. The combination, with a supply-spout, of a normally-effective main cut-off valve; a normally-ineffective dependently-operative safety cut-off valve, normally open and controlled by the main valve on the failure of the latter to close properly; independently-operable valve-opening actuators for said respective valves; and valve-closing means.

6. The combination, with a supply-spout, of a normally-effective main cut-off valve; a normally-ineffective safety-valve, normally open; a common valve-closing actuator for said valves; and a pair of independently-operable valve-opening actuators for said respective valves.

7. The combination, with a supply-spout, of a normally-effective main cut-off valve; a normally-ineffective safety cut-off valve, normally open; a linkage connecting said valves; and valve-closing means in operative relation with said linkage.

8. The combination, with a supply-spout, of a normally-effective main cut-off valve; a normally-ineffective safety cut-off valve, normally open; a linkage connecting said valves; and a common valve-closing actuator connected with said linkage.

9. The combination, with a supply-spout, of a normally-effective main cut-off valve; a normally-ineffective safety cut-off valve, normally open; a linkage connecting said valves and having two alternately-effective fixed points; and a common valve-closing actuator connected with said linkage.

10. The combination, with a supply-spout, of a normally-effective main cut-off valve; a normally-ineffective safety cut-off valve, normally open; a linkage connecting said valves and having two alternately-effective fixed points at opposite ends of the linkage; and a common valve-closing actuator connected with said linkage.

11. The combination, with a supply-spout, of a pair of oppositely-closing cut-off valves one constituting a normally-effective main cut-off valve and the other a normally-ineffective dependently-operative safety cut-off valve controlled by the main valve on the failure of the latter to close properly; and valve-closing means operable for closing said valves selectively and in opposite directions.

12. The combination, with a supply-spout, of a normally-effective main cut-off valve; a normally-ineffective safety cut-off valve, normally open; a linkage connecting said valves; a common valve-closing actuator connected with said linkage; and a stop movable in unison with the main cut-off valve for normally limiting the closing movement of the valve-closing actuator.

13. In an automatic weighing-machine, the combination, with a supply-spout, of a normally-effective main cut-off valve; a normally-ineffective safety cut-off valve; valve-closing means; blocking-stops movable with said respective valves; and a coöperative blocking-stop operative with a movable discharge-controlling member of the weighing-machine.

14. In an automatic weighing-machine, the combination, with a pair of supply-spouts, of a pair of separately-mounted cut-off valves, one for each of said spouts and one normally effective and the other normally ineffective; valve-closing means; blocking-stops movable with said respective valves; and a coöperative blocking-stop operative with a movable discharge-controlling member of the weighing-machine.

15. In an automatic weighing-machine, the combination, with a supply-spout, of a normally-effective main cut-off valve; a normally-ineffective dependently-operative safety cut-off valve controlled by the main valve on the failure of the latter to close properly; valve-closing means; blocking-stops movable with said respective valves; and a coöperative blocking-stop operative with a movable discharge-controlling member of the weighing-machine.

16. In an automatic weighing-machine, the combination, with a supply-spout, of a normally-effective main cut-off valve; a normally-ineffective safety cut-off valve; valve-closing means; blocking-stops movable with said respective valves; and a pair of blocking-stops coöperative with the first-mentioned stops and operative with a discharge-controlling member of the weighing-machine.

17. In an automatic weighing-machine, the combination, with a supply-spout, of a normally-effective main cut-off valve; a normally-ineffective safety cut-off valve; valve-closing means; blocking-stops movable with said respective valves; and a pair of blocking-stops coöperative with said first-mentioned stops and movable in unison and operative with a discharge-controlling member of the weighing-machine.

18. In an automatic weighing-machine, the combination, with overloading means and with weighing mechanism embodying a load-receiver having a load-reducing opening between its receiving and discharging ends, of a swinging spout in position to receive surplus material from the load-reducing opening; and actuating means operative on the descent of the load-receiver for swinging said spout away from the bucket and also operative on the discharge of the load for swinging said spout toward the load-receiver to thereby restore the material in the spout to the load.

19. In an automatic weighing-machine, the combination, with overloading means and with weighing mechanism embodying a load-receiver having a load-reducing opening between its receiving and discharging ends, of a swinging spout pivoted to the load-receiver beneath the load-reducing opening; and actuating means operative on the descent of the load-receiver for swinging said spout from the load-receiver and also operative on the discharge of the load for swinging said spout toward the load-receiver to thereby restore the material in the spout to the load.

20. In an automatic weighing-machine, the combination, with overloading means and with weighing mechanism embodying a load-receiver having a load-reducing opening between its receiving and discharging ends, of a swinging spout pivoted to the load-receiver beneath the load-reducing opening; a fixed cut-off plate on the load-receiver normally closing the discharge end of the spout; an auxiliary material-receiving opening in the load-receiver beneath said spout; and actuating means operative on the descent of the bucket for swinging said spout away from the cut-off plate and the load-receiver and also operative on the discharge of the load for swinging said spout toward the auxiliary material-receiving opening to thereby restore the material in the spout to the load.

21. In an automatic weighing-machine, the combination with framework and with stream-supplying means and weighing mechanism, of a counterpoised regulator located in the path of material discharged by the weighing mechanism and embodying a pair of oppositely-disposed inclined blades pivoted at their lower edges to the framework and connected for movement in unison and forming between them a trough having yielding sides.

22. An automatic weighing-machine embodying framework, a load-receiver, and a pair of independently-mounted separately-movable beam mechanisms both supported directly by the framework, and one carrying the load-receiver, and the other carrying another material-receiver coöperative with the load-receiver.

23. In an automatic weighing-machine, the combination, with framework, of a pair of separately-movable beam mechanisms both supported directly by the framework, and a load-receiver and a load-discharger supported, respectively, on said beam mechanisms.

24. In an automatic weighing-machine, the combination, with framework, of primary beam mechanism; secondary beam mechanism supported directly by the framework and normally movable in unison with the primary beam mechanism and separately movable during a determined period in the weighing of a load; a load-receiver carried by the primary beam mechanism; and a load-discharger carried by the secondary beam mechanism.

25. In an automatic weighing-machine, the combination, with framework, of stream-supplying means; primary beam mechanism; secondary beam mechanism normally movable in unison with the primary beam mechanism and separately movable on the release of the load-discharger; a load-receiver carried by the primary beam mechanism; a load-discharger carried by the secondary beam mechanism; a latch for the load-discharger; and latch-tripping means.

26. In an automatic weighing-machine, the combination, with framework, of a pair of in-independently-mounted separately-movable superposed beam mechanisms both supported directly by the framework; and a load-receiver and a load-discharger superposed and carried, respectively, by said respective beam mechanisms.

27. In an automatic weighing-machine, the combination, with framework, of a pair of independently-mounted separately-movable beam mechanisms both supported directly by the framework; and a load-receiver and a load-discharger pivotally carried, respectively, by said respective beam mechanisms and having their pivots equidistant from the pivots of their respective beam mechanisms.

28. In an automatic weighing-machine, the combination, with framework, of valve mechanism; primary beam mechanism; secondary beam mechanism supported directly by the framework; a valve-opening actuator carried by the primary beam mechanism; a load-receiver also carried by the primary beam mechanism; and a load-discharger carried by the secondary beam mechanism.

29. In an automatic weighing-machine, the combination, with framework, of a pair of separately-movable beam mechanisms both supported directly by the framework; a load-receiver carried by one of said beam mechanisms; and a load-discharger suspended from the other beam mechanism.

30. In an automatic weighing-machine, the combination, with framework, of a pair of separately-movable beam mechanisms both supported directly by the framework; a load-receiver carried by one of said beam mechanisms; a load-discharger suspended from the other beam mechanism; and guiding means for positioning the load-discharger during its movements.

FRANCIS H. RICHARDS.

Witnesses:
F. N. CHASE,
WM. H. BLODGETT.